(12) United States Patent
Ku et al.

(10) Patent No.: US 11,480,471 B2
(45) Date of Patent: Oct. 25, 2022

(54) INFRARED TEMPERATURE SENSOR

(71) Applicant: ORIENTAL SYSTEM TECHNOLOGY INC., Hsinchu (TW)

(72) Inventors: Jenping Ku, Baoshan Township, Hsinchu County (TW); Chein-Hsun Wang, Hsin-Chu (TW); Chein-Hsing Yu, Zhudong Township, Hsinchu County (TW); Wen-Chang Yu, Taoyuan (TW)

(73) Assignee: ORIENTAL SYSTEM TECHNOLOGY INC., Hsinchu (TW)

( * ) Notice: Subject to any disclaimer, the term of this patent is extended or adjusted under 35 U.S.C. 154(b) by 191 days.

(21) Appl. No.: 17/129,074

(22) Filed: Dec. 21, 2020

(65) Prior Publication Data
US 2022/0113203 A1 Apr. 14, 2022

(30) Foreign Application Priority Data
Oct. 13, 2020 (TW) .................................. 109213369

(51) Int. Cl.
| | | |
|---|---|---|
| *G01J 5/10* | (2006.01) | |
| *G01K 15/00* | (2006.01) | |
| *G01K 1/20* | (2006.01) | |

(52) U.S. Cl.
CPC .................. *G01J 5/10* (2013.01); *G01K 1/20* (2013.01); *G01K 15/005* (2013.01); *G01J 2005/106* (2013.01)

(58) Field of Classification Search
CPC . G01K 15/005; G01K 1/20; G01J 5/10; G01J 2005/106
See application file for complete search history.

(56) References Cited

U.S. PATENT DOCUMENTS

2017/0122802 A1* 5/2017 Brown ...................... E06B 9/24

* cited by examiner

*Primary Examiner* — Hugh Maupin
(74) *Attorney, Agent, or Firm* — Muncy, Geissler, Olds & Lowe, P.C.

(57) ABSTRACT

An infrared temperature sensor comprises a first communication port and a second communication port. A plurality of infrared temperature sensors can be cascaded to each other and connected to an external host controller through the second communication port. The external host controller can set up and administer the unique addresses of the plurality of the infrared temperature sensors through the second communication port, whereby to selectively perform multicasting communication or unicasting communication with the plurality of infrared temperature sensors through the first communication port. The infrared temperature sensor further comprises a second thermopile sensing element used to sense the thermal radiation of a package structure, whereby to compensate for the measurement error induced by temperature variation of the package structure. Thus, the measurement accuracy is increased.

19 Claims, 6 Drawing Sheets

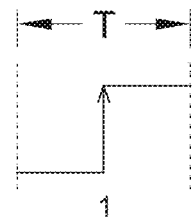 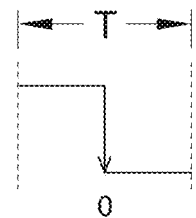
Fig. 6a          Fig. 6b
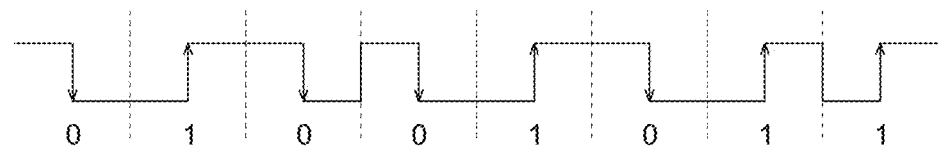
Fig. 6c

INFRARED TEMPERATURE SENSOR

BACKGROUND OF THE INVENTION

1. Field of the Invention

The present invention relates to an infrared temperature sensor, particularly ease-of-addressing of multiple infrared temperature sensors in the same bus.

2. Description of the Prior Art

For industry safety, there is a need to monitor the temperatures of apparatuses, whereby to send out alarms or interrupt power supply while an abnormality occurs. However, in many situations, the space factor impairs using a single infrared temperature sensor or infrared array temperature sensor to monitor the working temperature of the whole apparatus.

For example, the narrow space inside an electrical distribution box containing switchboards that only allow the distance between an infrared temperature sensor and the objects to be detected in the range of 3-5 cm. Hence, the detection region of the infrared temperature sensor has a diameter of only 6-10 cm. Therefore, the monitored regions cannot be completely detected unless a plurality of infrared temperature sensors are used. Consequently, temperature monitoring would have higher cost and lack of economic efficiency.

The battery of an electric vehicle is normally equipped with temperature sensors. The whole battery assembly may have an irreversible damage if the temperature sensors inside the battery malfunction. Therefore, an external contactless temperature sensor gives extra protection for the safety of battery system. The battery assembly of an electric vehicle has large area and very limited interior space. Therefore, the distance between the infrared temperature sensor and the battery assembly is very short. Hence, a plurality of infrared temperature sensors must be used to completely monitor all the monitored regions.

Another scenario is a server in the data center that normally uses a great number of disc arrays. Increasing temperature would decrease the service life of disc drives. If electric fans persistently operate to reduce the working temperature, the vibration of fan motors will increase the error rate of the output data of the disc drives. Therefore, the optimized operation mode for the server is to turn on fans when the server's working temperature exceeds a preset temperature. Similarly, the server also has a narrow interior space and needs a plurality of infrared temperature sensors to complete all regions to be monitored.

Refer to FIG. 1. In a multi-point temperature measurement scenario, the host controller 11 needs to collect data from a plurality of temperature sensors 12a, 12b and 12c. The temperature sensors 12a, 12b and 12c are electrically connected with the host controller 11 through communication ports 121 and a first communication architecture C1. For example, the first communication architecture C1 may be a bus architecture. While the host controller 11 receives temperature signals from different temperature sensors 12a, 12b and 12c through the same bus, the temperature sensors 12a, 12b and 12c should have their own addresses lest data conflict.

In a conventional address administration method, specific addresses are preloaded into the non-volatile memories of the temperature sensors 12a, 12b and 12c beforehand. However, address conflict may occur in field installation. Besides, the host controller 11 must record the addresses of the temperature sensors 12a, 12b and 12c, which will increase the administration cost of field installation and service. In another conventional address administration method, specific addresses are provided to the temperature sensors 12a, 12b and 12c through external jumpers 13a, 13b and 13c. However, the external jumpers 13a, 13b and 13c would increase the volume. Besides, the apparatus has only a limited number of I/O ports, which results in difficulties of expansion.

It should be also noted: the accuracy of contactless infrared temperature sensors is likely to be affected by variation of ambient temperature. For an example, the temperature environment of a running electric vehicle will change persistently. For another example, starting an electric fan of a server will cause a great change of the working temperature environment. All the above mentioned cases result in measurement errors of infrared temperature sensors.

Accordingly, the manufacturers are eager to achieve the targets: simplifying the method of addressing a plurality of infrared temperature sensors, improving the method of administrating a plurality of infrared temperature sensors and improving the measurement accuracy.

SUMMARY OF THE INVENTION

The present invention provides an infrared temperature sensor, which comprises a first communication port and a second communication port. A plurality of infrared temperature sensor is cascaded to each other through the second communication port to facilitate an external host controller to set up and administrate the addresses of the infrared temperature sensors. The infrared temperature sensor further comprises a second thermopile sensing element, which can detect the thermal radiation of a package structure, whereby to compensate for the measurement error caused by temperature variation of the package structure and increase the accuracy of measurement.

In one embodiment, the infrared temperature sensor of the present invention comprises a substrate, a cover, an infrared sensing chip, an infrared filter plate, an ambient temperature sensor, and a signal processor. The cover is disposed on the substrate and cooperates with the substrate to define a receiving space. The cover includes a window and a shield member. The infrared sensing chip is disposed on the substrate inside the receiving space and electrically connected with the substrate. The infrared sensing chip includes at least one first thermopile sensing element and a second thermopile sensing element. The first thermopile sensing element is corresponding to the window, and configured for receiving a first infrared light beam from the exterior and generating a first sensation signal. The second thermopile sensing element is corresponding to the shield member, and configured for receiving a second infrared light beam radiated by the shield member and generating a second sensation signal. The infrared filter plate is disposed on the window and allows the first infrared light beam having a specific range of optical wavelengths to pass. The ambient temperature sensor detects an ambient temperature to generate an ambient temperature sensation signal. The signal processor is electrically connected with the first thermopile sensing element, the second thermopile sensing element, and the ambient temperature sensor and processes the first sensation signal, the second sensation signal and the ambient temperature sensation signal. The signal processor includes a first communication port and a second communication port. The first communication port is a bus architecture. A host controller selectively performs multicasting communication or unicasting communication with the infrared temperature sensor through the first communication port. The second communication port connects the plurality of infrared temperature sensors to the host controller in series, whereby each of the infrared temperature sensors can receive an address data assigned by the host controller.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein:

FIGS. 6a-6c schematically show a Manchester coding method;

DESCRIPTION OF THE PREFERRED EMBODIMENTS

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
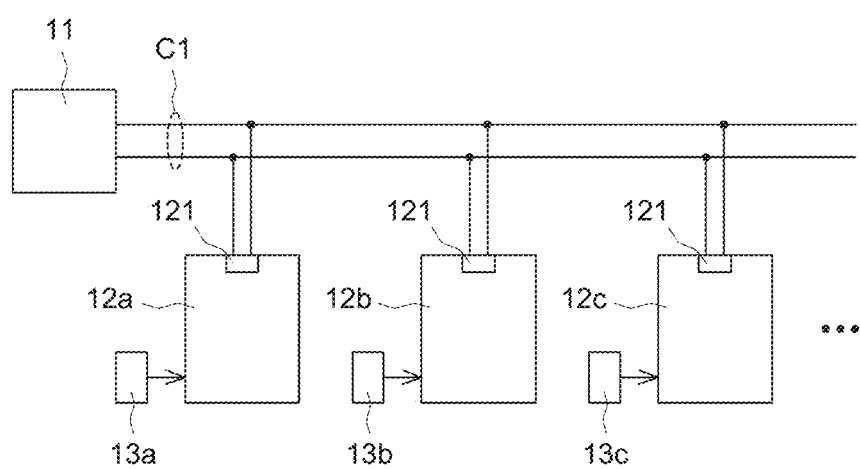
FIG. 1 schematically shows a conventional communication architecture of a plurality of infrared temperature sensors and a host controller.
Figure 2:
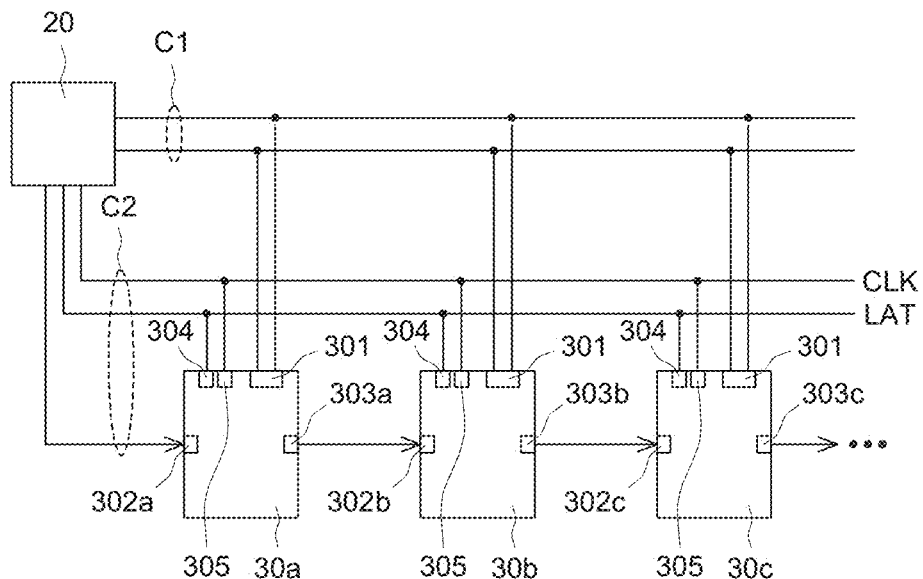
FIG. 2 schematically shows a communication architecture of a plurality of infrared temperature sensors and a host controller according to a first embodiment of the present invention.

Refer to FIG. 2. FIG. 2 schematically shows a communication architecture of a plurality of infrared temperature sensors 30a, 30b and 30c and a host controller 20 according to a first embodiment of the present invention. Each of the infrared temperature sensors 30a, 30b and 30c includes a first communication port 301. The first communication port 301 is a bus architecture, electrically connected with the host controller 20 through a first communication architecture C1. The host controller 20 may selectively perform multicasting communication or unicasting communication with the infrared temperature sensors 30a, 30b and 30c. For example, the host controller 20 collects the temperatures detected by the infrared temperature sensors 30a, 30b and 30c. In one embodiment, the first communication port 301 may be an RS-485 or TIA-485 based interface with a Universal Asynchronous Receiver/Transmitter (UART) driver, or an Inter-Integrated Circuit ($I^2C$) interface.

Each of the infrared temperature sensors 30a, 30b and 30c also includes a second communication port, which is electrically connected with the host controller 20 through a second communication architecture C2. In the embodiment shown in FIG. 2, the second communication port includes a cascade input port 302a, 302b or 302c, a cascade output port 303a, 303b or 303c, a first connection port 304, and a second connection port 305. The cascade output port is electrically connected with the cascade input port of the downstream infrared temperature sensor. The cascade input port of the most upstream infrared temperature sensor is electrically connected with the host controller 20. In details, the cascade output port 303a of the infrared temperature sensor 30a is electrically connected with the cascade input port 302b of the downstream infrared temperature sensor 30b; the cascade output port 303b of the infrared temperature sensor 30b is electrically connected with the cascade input port 302c of the downstream infrared temperature sensor 30c; the cascade input port 302a of the most upstream infrared temperature sensor 30a is electrically connected with the host controller 20. In brief, the infrared temperature sensors 30a, 30b and 30c are cascaded in sequence to the host controller 20 through the cascade input ports 302a, 302b and 302c and the cascade output ports 303a, 303b and 303c; the host controller 20 assigns specific address data to the infrared temperature sensors 30a, 30b and 30c through the cascade input ports 302a, 302b and 302c and the cascade output ports 303a, 303b and 303c.

The first connection port 304 is electrically connected with the host controller 20 to receive a latch signal LAT sent out by the host controller 20. The second connection port 305 is electrically connected with the host controller 20 to receive a clock signal CLK sent out by the host controller 20. In the embodiment shown in FIG. 2, the infrared temperature sensors 30a, 30b and 30c are connected in parallel with the host controller 20. Thus, the second communication architecture C2 may involve bus signals (such as the latch signal LAT and the clock signal CLK) and serial signals (such as the address data).

Figure 3:
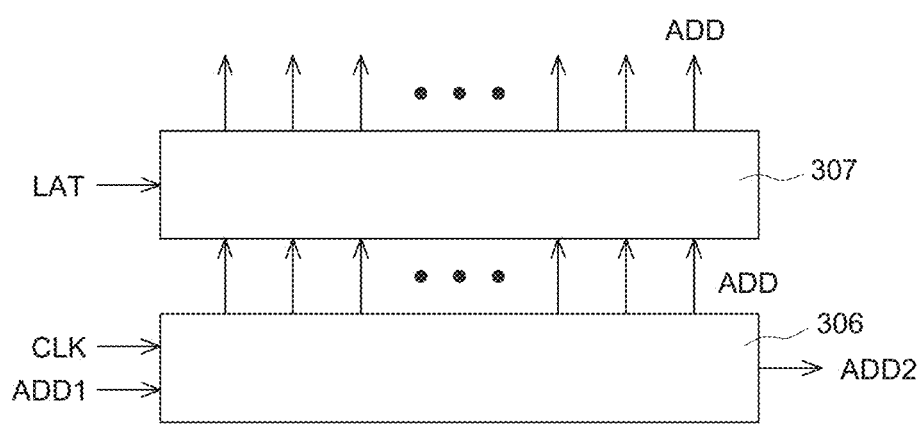
FIG. 3 schematically shows an addressing architecture of infrared temperature sensors according to one embodiment of the present invention.

Refer to FIG. 3. Each of the infrared temperature sensors 30a, 30b and 30c includes a shift register 306 and a latch register 307. The shift register 306 may shift the address data sent by the host controller 20 to the next infrared temperature sensor. The shift register 306 may receive and temporarily store an address data ADD1 sent out by the host controller 20, and simultaneously shift another address data ADD2 received last time to the downstream infrared temperature sensor. While the infrared temperature sensors 30a, 30b and 30c receive the latch signals LAT, the address data ADD, which are temporarily stored in the shift registers 306, are output to the latch registers 307. The address data ADD temporarily stored in the latch registers 307 may be further stored into the non-volatile memories of the infrared temperature sensors 30a, 30b and 30c to function as unique addresses of the infrared temperature sensors 30a, 30b and 30c. Then, the host controller 20 may perform unicasting communication with each of the infrared temperature sensors 30a, 30b and 30c through the unique address thereof in the first communication architecture C1. In one embodiment, the shift register 306 may be an 8-bit or 16-bit shift register, whereby to effectively administrate the serial data of the addresses of a lot of infrared temperature sensors.

For example, while the system is initiated or started, the host controller 20 reads the address data stored in the non-volatile memory of each of the infrared temperature sensors 30a, 30b and 30c for the succeeding unicasting communication. If any one of the infrared temperature sensors 30a, 30b and 30c only has a multicasting address (such as OOH), it indicates that unique addresses have not been assigned to the infrared temperature sensors. In such a case, the host controller 20 may assign address data to each of the infrared temperature sensors 30a, 30b and 30c through the second communication architecture C2. Suppose that the system includes N pieces of infrared temperature sensors. The host controller 20 may send out in sequence N pieces of unique addresses through the cascade input ports 302a, 302b and 302c and the cascade output ports 303a, 303b and 303c; the N pieces of address data are further one by one shifted to the infrared temperature sensors 30a, 30b and 30c. After the N pieces of address data have been transmitted, the host controller 20 sends out the latch signals LAT to make the infrared temperature sensors 30a, 30b and 30c store the address data ADD, which are temporarily stored in the infrared temperature sensors 30a, 30b and 30c, into the non-volatile memories of the infrared temperature sensors 30a, 30b and 30c to function as the unique addresses of the infrared temperature sensors 30a, 30b and 30c. Then, the host controller 20 may perform unicasting communication with each of the infrared temperature sensors 30a, 30b and 30c through the unique addresses in the first communication architecture C1.

Figure 4:
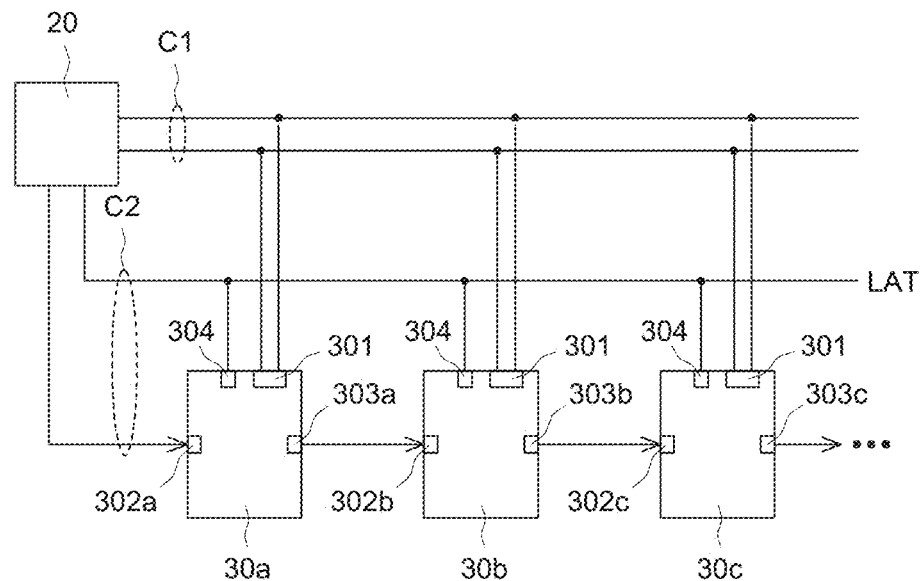
FIG. 4 schematically shows a communication architecture of a plurality of infrared temperature sensors and a host controller according to a second embodiment of the present invention.

Refer to FIG. 4. FIG. 4 schematically shows a communication architecture of a plurality of infrared temperature sensors 30a, 30b and 30c and a host controller 20 according to a second embodiment of the present invention. In the second embodiment, the clock signal line of the bus signals in the second communication architecture C2 is omitted. In other words, only the latch signals LAT are preserved in the bus signals of the second communication architecture C2. The clock signals and the address data are transmitted in the same signal line and transmitted through the cascade input ports 302a, 302b and 302c and the cascade output ports 303a, 303b and 303c, whereby to decrease the number of the input/output ports of the infrared temperature sensor. In one embodiment, the clock signals and the address data are transmitted in a Manchester coding method. For example, during a period T, detecting a rising edge signal indicates a logic value "1", as shown in FIG. 6a; detecting a falling edge signal indicates a logic value "0", as shown in FIG. 6b. According to the coding method, the data "01001011" may be transmitted in the signal shown in FIG. 6c and then decoded to restore the original data.

Figure 5:
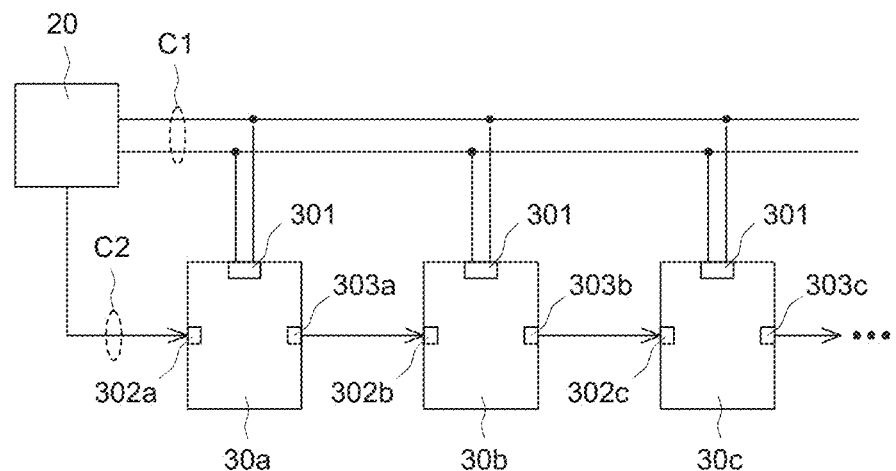
FIG. 5 schematically shows a communication architecture of a plurality of infrared temperature sensors and a host controller according to a third embodiment of the present invention.
Figure 7:
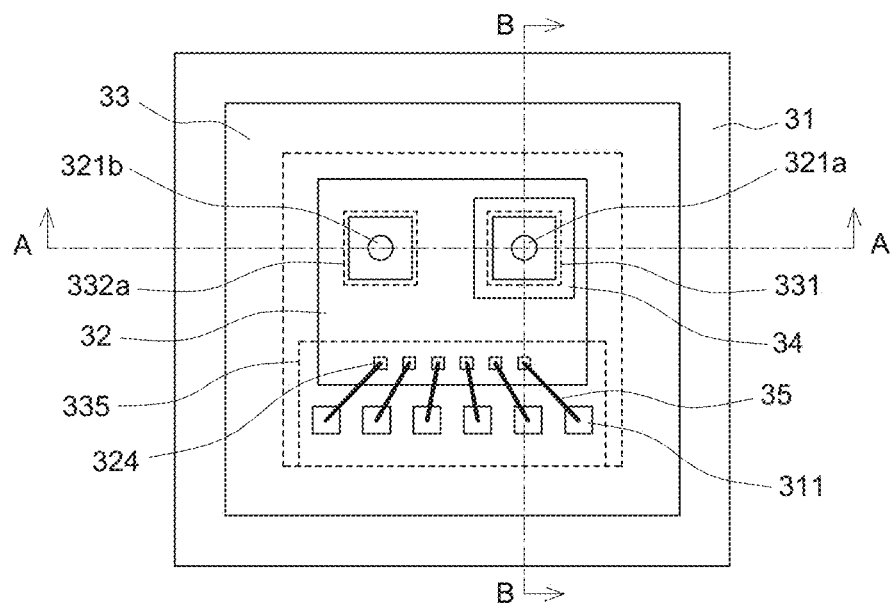
FIG. 7 schematically shows an infrared temperature sensor according to one embodiment of the present invention.

Refer to FIG. 5. FIG. 5 schematically shows a communication architecture of a plurality of infrared temperature sensors 30a, 30b and 30c and a host controller 20 according to a third embodiment of the present invention. In the third embodiment, the latch signal line of the bus signals in the second communication architecture C2 is also omitted. In other words, only the serial signals in the second communication architecture C2 are preserved. The clock signals and the address data are transmitted in the Manchester coding method. The latch signals LAT shown in FIG. 2 or FIG. 4 are transmitted in the first communication architecture C1, for example, thru global address (OOH) that all infrared temperature sensors must receive command without return signals. In other words, the infrared temperature sensors 30a, 30b and 30c receive the latch signals LAT through the first communication port 301. In the embodiment shown in FIG. 5, the infrared temperature sensor only includes a first communication port, a cascade input port and a cascade output port, but they are still sufficient to administrate a plurality of cascade infrared temperature sensors.

Refer to FIGS. 7-10. In one embodiment, the infrared temperature sensor of the present invention comprises a substrate 31, an infrared sensing chip 32, an ambient temperature sensor 322, a signal processor 323, a cover 33, and an infrared filter plate 34. The substrate 32 may be made of Bismaleimide Triazine (BT) resin, or a ceramic material. It is easily understood: the substrate 31 includes a plurality of electric contacts and appropriate traces for electrically connecting corresponding electric contacts. Thereby, the infrared sensing chip 32 can be electrically connected to the substrate 31, and the sensation signals generated by the infrared sensing chip 32 can be output to the external. The detailed structure of the substrate 32 is well known by the persons skilled in the art and will not repeat herein.

Figure 9:
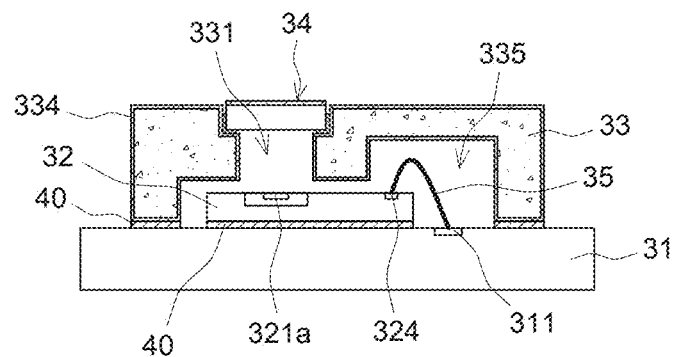
FIG. 9 schematically shows a sectional view of the infrared temperature sensor, which is taken along Line BB in FIG. 7.

The infrared sensing chip 32 is disposed on the substrate 31 and electrically connected with the substrate 31. Refer to FIG. 9. The infrared sensing chip 32 may be electrically connected with electric contacts 311 of the substrate 31 through electric contacts 324 and bonding wires 35. In one embodiment, the infrared sensing chip 32 is fixedly mounted on the substrate 31 with heat conduction glue 40. The heat conduction glue 40 can decrease the thermal resistance between the substrate 31 and the infrared sensing chip 32 and thus favors the infrared sensing chip 32 to detect ambient temperature.

Figure 10:
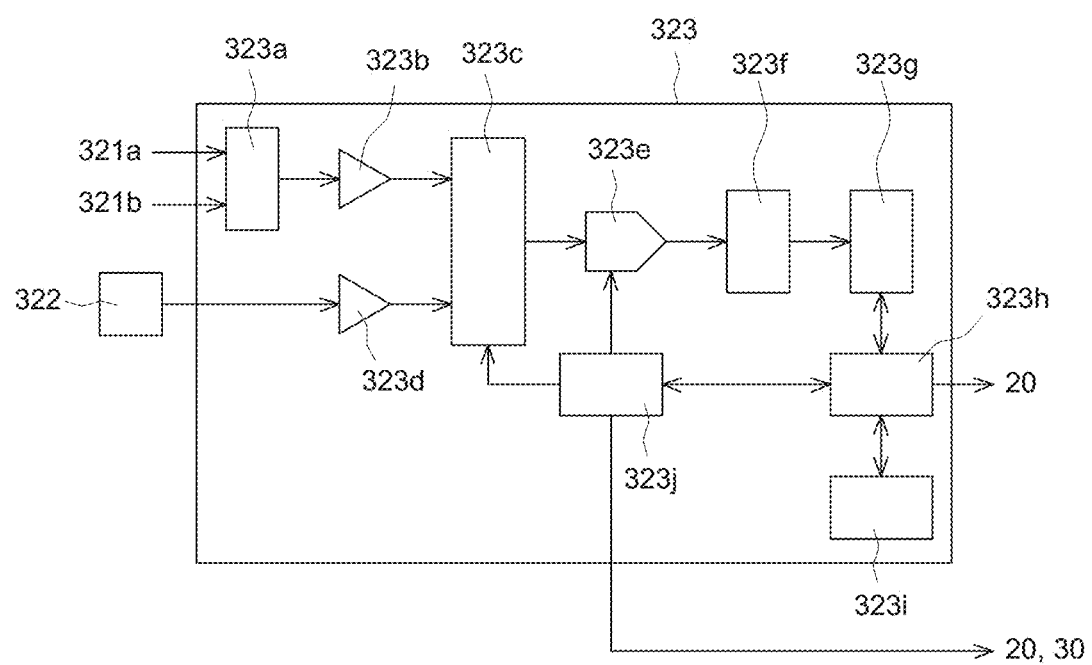
FIG. 10 schematically shows a signal processor of an infrared temperature sensor according to one embodiment of the present invention.

In one embodiment, the infrared sensing chip is an integrated chip. In one embodiment, the infrared sensing chip 32 includes a first thermopile sensing element 321a, a second thermopile sensing element 321b, an ambient temperature sensor 322 (as shown in FIG. 10), and a signal processor 323 (as shown in FIG. 10). In one embodiment, the ambient temperature sensor 322 is a silicon-based temperature sensor. The first thermopile sensing element 321a receives a first infrared light beam to generate a first sensation signal. The second thermopile sensing element 321b receives a second infrared light beam to generate a second sensation signal. The ambient temperature sensor 322 detects ambient temperature to generate an ambient temperature sensation signal. The signal processor 323 is electrically connected with the first thermopile sensing element 321a, the second thermopile sensing element 321b and the ambient temperature sensor 322, processing the first sensation signal, the second sensation signal and the ambient temperature sensation signal respectively output by the first thermopile sensing element 321a, the second thermopile sensing element 321b and the ambient temperature sensor 322. The ambient temperature sensor 322 may be an independent element. In one embodiment, the ambient temperature sensor 322 is a thermistor.

Figure 8:
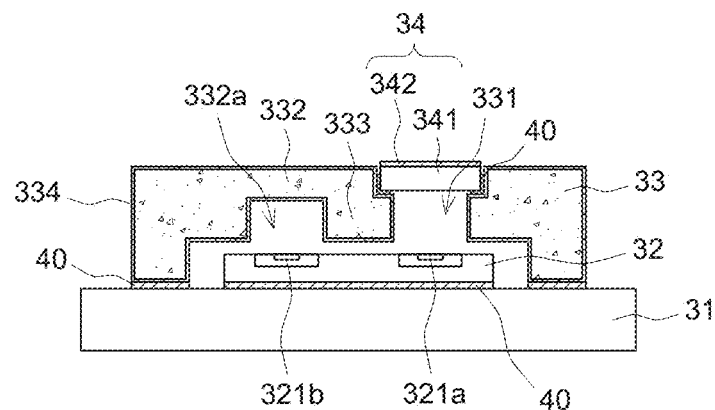
FIG. 8 schematically shows a sectional view of the infrared temperature sensor, which is taken along Line AA in FIG. 7.

The cover 33 is disposed on the substrate 31 and cooperates with the substrate 31 to define a receiving space. The infrared sensing chip 32 is disposed inside the receiving space between the cover 33 and the substrate 31. In one embodiment, the cover 33 is fixedly mounted on the substrate 31 with heat conduction glue 40. The heat conduction glue 40 can decrease the thermal resistance between the cover 33 and the substrate 31, whereby the temperature of the substrate 31 can easily vary with the temperature of the environment. Refer to FIG. 8. The cover 33 includes a window 331 and a shield member 332. The window 331 is corresponding to the first thermopile sensing element 321a, whereby the first thermopile sensing element 321a can receive thermal radiation from the exterior, such as the first infrared light beam emitted by the inspected object. The shield member 332 is corresponding to the second thermopile sensing element 321b, whereby the second thermopile sensing element 321b can only receive the second infrared light beam emitted by the shield member 332. In the embodiment sown in FIG. 8, the shield member 332 is a portion of the cover 33. However, the present invention is not limited by this embodiment. In one embodiment, the cover 33 includes another window corresponding to the second thermopile sensing element 321b, and a shield member is disposed on one side of the window to block the thermal radiation from the external heat source, whereby the embodiment can also achieve the same effect of blocking external thermal radiation. In one embodiment, the shield member includes a base material and a shield layer disposed on the surface of the base material. In one embodiment, the shield layer is a metal layer able to block external thermal radiation.

In one embodiment, the cover 33 includes a block wall 333 disposed between the first thermopile sensing element 321a and the second thermopile sensing element 321b. The block wall 333 can block infrared light lest the first thermopile sensing element 321a receive the second infrared light beam radiated by the shield member 332 or the second thermopile sensing element 321b receive the first infrared light beam radiated by the inspected object. In one embodiment, the cover 33 is made of a material that infrared light is unable to penetrate, such as a liquid crystal polymer (LCP). It is the advantage of the cover 33 made of LCP: the element would not melt, collapse or degrade in performance while the element passes through the reflow furnace in the SMD package.

The infrared filter plate 34 is disposed on one side of the window 331, allowing the infrared light having a specific range of optical wavelengths to pass. In one embodiment, the infrared filter plate 34 is fixedly mounted on the cover 33 with heat conduction glue 40. The heat conduction glue 40 can decrease the thermal resistance between the infrared filter plate 34 and the cover 33, whereby the temperature of the infrared filter plate 34 can easily vary with the temperature of the cover 33. In one embodiment, the infrared filter plate 34 includes a base material 341 and a filter layer 342 disposed on the base material 341, wherein the base material 341 may be a silicon base material.

In one embodiment, the infrared sensing chip includes a plurality of first thermopile sensing elements 321a, and the cover 33 includes a plurality of corresponding infrared filter plates, whereby to form a multi-channel infrared temperature sensor. In one embodiment, the infrared filter plates, which are corresponding to the plurality of first thermopile sensing elements 321a, respectively allow the infrared light beams having different ranges of optical wavelengths to pass, whereby to detect the intensities of the infrared light beams having different ranges of optical wavelengths and measure the ratio of infrared radiations of different ranges of optical wavelengths of the inspected object.

According to the structure mentioned above, the first thermopile sensing element 321a detects the thermal radiation of the external heat source through the window 331 of the cover 33; the second thermopile sensing element 321b detects the thermal radiation of the shield member 332 of the cover 33 (i.e. the package structure); the system uses the detection results of the second thermopile sensing element 321b as the basis for calibration and compensation. The infrared temperature sensor of the present invention can fast undertake calibration and compensation for the measurement errors resulting from the temperature variation of the package structure while the ambient temperature is fluctuating. For example, the ambient temperature may vary while the environment of an electric vehicle start or stop or the electric fan of a server is started.

Refer to FIG. 8 again. The cover 33 has an inner surface and an outer surface. A metal layer 334 is disposed on at least one of the inner surface and the outer surface. In one embodiment, the metal layer 334 may be made of copper, aluminum, nickel, chromium, or stainless steel. As mentioned above, the cover 33 may be made of a liquid crystal polymer (LCP). LCP is easy to be inject-molded. The metal layer 334 may be formed on the inner surface and outer surface of the cover 33 via a sputtering process or a chemical plating process. The metal layer 334 on the outer surface can block the thermal radiation of external heat sources. The metal layer 334 on the inner surface can reduce the emissivity of the cover 33 and enhance the infrared-blocking effect of the block wall 333. In one embodiment, the outer metal layer 334 and the inner metal layer 334 are connected with each other, whereby the high thermal conductivity of the metal layer 334 can fast balance the temperatures of the inner side and outer side of the cover 33. In one embodiment, the width of the block wall 333 is greater than or equal to 0.1 mm. For example, the width of the block wall 333 is 0.2 mm. In one embodiment, the distance from the block wall 333 to the infrared sensing chip 32 is smaller than or equal to 100 μm. For example, the distance from the block wall 333 to the infrared sensing chip 32 is 25-100 μm. In a preferred embodiment, the distance from the block wall 333 to the infrared sensing chip 32 is 50-75 μm.

Refer to FIG. 8 again. Air turbulence may induce thermal conduction between the shield member 332 and the second thermopile sensing element 321b. In one embodiment, the distance between the shield member 332 and the second thermopile sensing element 321b is greater or equal to 100 μm, whereby to prevent from the thermal conduction therebetween. In a preferred embodiment, the distance between the shield member 332 and the second thermopile sensing element 321b is 200-500 μm. In one embodiment, a cavity 332a is formed between the shield member 332 and the second thermopile sensing element 321b for controlling the distance between the shield member 332 and the second thermopile sensing element 321b. Refer to FIG. 9. It is easily understood: a cavity 335 may be formed in a region of the cover 33, which is corresponding to the wire-bonding area, to accommodate bonding wires 35. In one embodiment, the distance from the inner side of the cavity 335 to the infrared sensing chip 32 is greater than or equal to 200 μm.

Refer to FIG. 10. In one embodiment, the signal processor 323 includes multiplexers 323a and 323c, a programmable amplifier 323b, a buffer amplifier 323d, an analog-to-digital converter 323e, a digital filter 323f, a register 323g, a communication interface 323h, a non-volatile memory 323i, and a process controller 323j. The sensation signals of the first thermopile sensing element 321a and the second thermopile sensing element 321b are output to the multiplexer 323a and selected by the multiplexer 323a. The programmable amplifier 323b amplifies the signal and feeds forward the signal to the multiplexer 323c. The ambient temperature sensation signal of the ambient temperature sensor 322 is output to the buffer amplifier 323d. The buffer amplifier 323d amplifies the signal and feeds forward the signal to the multiplexer 323c.

The multiplexer 323c selects to output one of the sensation signals of the first thermopile sensing element 321a, the second thermopile sensing element 321b and the ambient temperature sensor 322 to the analog-to-digital converter 323e. The analog-to-digital converter 323e converts the sensation signal into a digital signal. The digital filter 323f processes the digital signal and stores the result in the register 323g. In one embodiment, the analog-to-digital converter 323e is a Sigma-Delta analog-to-digital converter, such as a 14 to 24-bit Sigma-Delta high-precision analog-to-digital converter. The communication interface 323h communicates with the host controller 20 through the first communication architecture C1, whereby to read data from or store data into the register 323g or the non-volatile memory 323i (such as the calibration parameters and unique addresses of the infrared temperature sensors), and whereby to select the signal channel and trigger the action of the process controller 323j. The process controller 323j communicates with the host controller 20 or another infrared temperature sensor 30 through the second communication architecture C2 for address administration. In one embodiment, the non-volatile memory 323i is an electrically-erasable programmable read-only memory (EEPROM), a flash memory, or a multiple-times programmable (MTP) memory. In one embodiment, the shift register 306 in FIG. 3 may be realized with hardware or realized by software (the instructions of the process controller 323j). The technology of the signal processor 323 is well known by the persons skilled in the art and will not repeat herein.

In conclusion, the infrared temperature sensor of the present invention comprises a first communication architecture and a second communication architecture. A plurality of infrared temperature sensors is cascaded to each other through the second communication architecture, whereby the external host controller can administrate the addresses of the cascaded infrared temperature sensors through the second communication architecture. Besides, the second thermopile sensing element of the infrared temperature sensor of the present invention can compensate the thermal radiation of the package structure. Thus, the present invention can fast calibrate and compensate for the measurement errors caused by the temperature variation of the package structure. Therefore, the present invention can promote the accuracy of temperature measurement in harsh environment.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the appended claims. The embodiments has been described above to demonstrate the technical thoughts and characteristics of the present invention and enable the persons skilled in the art to understand, make, and use the present invention. However, these embodiments are only to exemplify the present invention but not intended to limit the scope of the present invention. Any equivalent modification or variation according to the spirit of the present invention is to be also included by the scope of the present invention.

What is claimed is:

1. An infrared temperature sensor, comprising:
   a substrate;
   a cover, disposed on the substrate, cooperating with the substrate to define a receiving space, and including a window and a shield member;
   an infrared sensing chip, disposed on the substrate inside the receiving space, electrically connected with the substrate, and including at least one first thermopile sensing element and a second thermopile sensing element, wherein the first thermopile sensing element is corresponding to the window of the cover and receives a first infrared light beam from exterior to generate a first sensation signal; the second thermopile sensing element is corresponding to the shield member of the cover and receives a second infrared light beam radiated by the shield member to generate a second sensation signal;
   an infrared filter plate, disposed on the window, and allowing the first infrared light beam having a specific range of optical wavelengths to pass;
   an ambient temperature sensor, detecting an ambient temperature to generate an ambient temperature sensation signal; and
   a signal processor, electrically connected with the first thermopile sensing element, the second thermopile sensing element and the ambient temperature sensor to process the first sensation signal, the second sensation signal and the ambient temperature sensation signal, wherein the signal processor includes:
      a first communication port, being a bus architecture, wherein a host controller selectively performs multicasting communication or unicasting communication with the infrared temperature sensor through the first communication port; and
      a second communication port, cascading a plurality of the infrared temperature sensors to the host controller to enable the plurality of the infrared temperature sensors to receive address data that the host controller respectively assigns to the infrared temperature sensors.

2. The infrared temperature sensor according to claim 1, wherein the second communication port includes a cascade input port and a cascade output port, wherein the cascade output port is electrically connected with the cascade input port of the infrared temperature sensor in a downstream side and the cascade input port of the infrared temperature sensor in the most upstream side is electrically connected with the host controller.

3. The infrared temperature sensor according to claim 2, wherein the signal processor includes a shift register; the shift register receives and temporarily stores one piece of address data and outputs another piece of address data to the infrared temperature sensor in the downstream side in sequence.

4. The infrared temperature sensor according to claim 2, wherein the address data and a clock signal are encoded in a Manchester coding method and shifted to each of the infrared temperature sensors in sequence through the cascade input ports and the cascade output ports;

and a latch signal is transmitted to each of the infrared temperature sensors through the first communication port.

5. The infrared temperature sensor according to claim 2, wherein the second communication port includes a first connection port; the first connection port is electrically connected with the host controller to receive a latch signal; the address data and a clock signal are encoded in a Manchester coding method and shifted to each of the infrared temperature sensors in sequence through the cascade input ports and the cascade output ports.

6. The infrared temperature sensor according to claim 2, wherein the second communication port includes a first connection port and a second connection port; the first connection port and the second connection port are electrically connected with the host controller and respectively receive a latch signal and a clock signal; the address data are shifted to each of the infrared temperature sensors in sequence through the cascade input ports and the cascade output ports.

7. The infrared temperature sensor according to claim 1, wherein the first communication port is an RS-485 or TIA-485-based interface with Universal Asynchronous Receiver/Transmitter (UART) driver, or an Inter-Integrated Circuit (I2C) interface.

8. The infrared temperature sensor according to claim 1 comprising a plurality of the first thermopile sensing elements and a plurality of the infrared filter plates, wherein the plurality of the infrared filter plates respectively allows light beams, which separately have different ranges of optical wavelengths, to pass.

9. The infrared temperature sensor according to claim 1, wherein the signal processor includes a non-volatile memory and the non-volatile memory stores the address data and a calibration parameter of the infrared temperature sensor.

10. The infrared temperature sensor according to claim 1, wherein the ambient temperature sensor is a thermistor disposed in the receiving space or a silicon-based temperature sensor disposed in the infrared sensing chip.

11. The infrared temperature sensor according to claim 1, wherein a distance from the shield member to the second thermopile sensing element is greater than or equal to 100 μm.

12. The infrared temperature sensor according to claim 1, wherein a metal layer is formed on at least one of an inner surface and an outer surface of the cover.

13. The infrared temperature sensor according to claim 1, wherein the cover includes a block wall; the block wall is corresponding to a position between the first thermopile sensing element and the second thermopile sensing element to reduce amount of the first infrared light beam received by the second thermopile sensing element.

14. The infrared temperature sensor according to claim 13, wherein a distance from the block wall to the infrared sensing chip is smaller than or equal to 100 μm.

15. The infrared temperature sensor according to claim 13, wherein a width of the block wall is greater than or equal to 0.1 mm.

16. The infrared temperature sensor according to claim 1, wherein the cover is made of a crystal liquid polymer (LCP).

17. The infrared temperature sensor according to claim 1, wherein the cover is joined to the substrate with a heat conduction glue.

18. The infrared temperature sensor according to claim 1, wherein the infrared filter plate is joined to the cover with a heat conduction glue.

19. The infrared temperature sensor according to claim 1, wherein the substrate is made of Bismaleimide Triazine (BT) resin, or a ceramic material.

* * * * *